United States Patent [19]
Fan

[11] Patent Number: 5,243,444
[45] Date of Patent: Sep. 7, 1993

[54] IMAGE PROCESSING SYSTEM AND METHOD WITH IMPROVED RECONSTRUCTION OF CONTINUOUS TONE IMAGES FROM HALFTONE IMAGES INCLUDING THOSE WITHOUT A SCREEN STRUCTURE

[75] Inventor: Zhigang Fan, Webster, N.Y.

[73] Assignee: Xerox Corporation, Stamford, Conn.

[21] Appl. No.: 857,557

[22] Filed: Mar. 25, 1992

[51] Int. Cl.$^5$ .................................................. H04N 1/40
[52] U.S. Cl. ................................ 358/456; 358/466; 358/465; 358/462; 358/455; 382/54
[58] Field of Search ............... 358/456, 455, 448, 466, 358/465, 462, 453; 382/54, 50

[56] References Cited

U.S. PATENT DOCUMENTS

| | | | |
|---|---|---|---|
| 4,503,461 | 3/1985 | Nishimura | 358/463 |
| 4,691,366 | 9/1987 | Fenster et al. | 358/54 |
| 4,722,008 | 1/1988 | Ibaraki et al. | 358/456 |
| 4,730,219 | 3/1988 | Oshikoshi | 358/456 |
| 4,782,399 | 11/1988 | Sato | 358/443 |
| 4,811,239 | 3/1989 | Tsao | 358/456 |
| 4,841,374 | 6/1989 | Kotani et al. | 358/456 |

*Primary Examiner*—Edward L. Coles, Sr.
*Assistant Examiner*—Fan Lee
*Attorney, Agent, or Firm*—Finnegan, Henderson, Farabow, Garrett & Dunner

[57] ABSTRACT

An image processing system converts unscreened and other halftone images to continuous tone images. Value data is sequencitally generated for successive pixels of a screened or unscreened halftone image. Each image pixel is Sigma filtered with a predetermined set of filter parameters including the filter window size and a Sigma difference range that is applied to determine which pixels in the filter window are counted in determining average window pixel values. An output continuous tone image containing the Sigma filtered pixels is generated for storage and/or processing to a halftone copy or print.

8 Claims, 3 Drawing Sheets

IMAGE PROCESSING SYSTEM AND METHOD WITH IMPROVED RECONSTRUCTION OF CONTINUOUS TONE IMAGES FROM HALFTONE IMAGES INCLUDING THOSE WITHOUT A SCREEN STRUCTURE

CROSS-REFERENCE TO RELATED APPLICATIONS

Reference is made to the following concurrently filed patent applications that are assigned to the present assignee and are hereby incorporated by reference:

Ser. No. 07/815,219, entitled IMAGE PROCESSING SYSTEM AND METHOD EMPLOYING HYBRID FILTERING TO PROVIDE IMPROVED RECONSTRUCTION OF CONTINUOUS TONE IMAGES FROM HALFTONE SCREEN-STRUCTURED IMAGES, by Zhigang Fan.

Ser. No. 07/928,388 entitled IMAGE PROCESSING SYSTEM AND METHOD EMPLOYING ADAPTIVE FILTERING TO PROVIDE IMPROVED RECONSTRUCTION OF CONTINUOUS TONE IMAGES FROM HALFTONE IMAGES INCLUDING THOSE WITHOUT A SCREEN STRUCTURE, by Paul G. Roetling.

BACKGROUND OF THE INVENTION

The present invention relates to image processing systems and methods having a capability for processing halftone images to retrieve continuous tone images and more particularly to systems and methods for converting halftone images without screen structure and other halftone images to continuous tone images.

Continuous tone images are converted to halftone or binary images to enable the production of printed copies. In binary form, the image has pixels which are either black or white and which are printed by applying ink or not applying ink.

It is usually difficult to process a halftone image such as for scaling and enhancement. Often, moire or distortion is introduced. Normally, therefore, the halftone image is first reconverted to a continuous tone image to enable processing and thereafter reconverted to a halftone image for printing.

Image processing systems used with printers in reprographic systems typically require a capability for converting halftone images to continuous tone images to meet reconversion needs and for converting scanned halftone images to continuous tone images that can then be processed by any of a large variety of enhancement algorithms commonly available for continuous tone images.

The halftoning process loses some image information in the conversion of the original continuous tone image to a halftone image. The reconversion of a halftone image to a continuous tone image accordingly is essentially an estimation process since the halftoning process cannot be reversed exactly to reproduce a continuous tone image identical to the original image.

One common process for converting continuous tone images to halftone images is a process called ordered dithering. The majority of images currently processed in the printing industry are dithered images since most printers can only print dithered images. Generally, ordered dithering is a process in which a scanned continuous signal from a continuous tone image is converted to a series of black (1 or ink) or white (0 or no ink) pixels with the pixel values determined by the pattern of a threshold or dither matrix to which the scanned signal is applied.

Another process used to convert continuous tone images to halftone images is called error diffusion. No special thresholding matrix is used in the error diffusion process. Instead, a single threshold is applied to the whole image. Generally, image pixels are processed sequentially, i.e., the first pixel is made either 1 or 0 according to whether its gray level is above or below a predetermined threshold value such as 0.5. The first pixel error is then carried forward and added to the gray value of the unprocessed surrounding pixels in determining whether these pixels are above or below the threshold value. The resultant errors are then carried forward, and the process is continued until the image is completely processed. Error diffused images normally can only be printed by very high resolution printers.

The classic prior art method for converting halftone images to continuous tone images, i.e., for "unscreening" continuous tone images from halftone images, applies a low-pass filter to the halftone image data. The low-pass filter method by its nature typically blurs image edges or at least loses fidelity of edge information (fine detail) as a result of the filter conversion process.

U.S. Pat. No. 4,630,125 to Roetling, and assigned to the present assignee, discloses a method of reconstructing a continuous tone image for grayscale values that have been converted to a halftone image of black and white spots. The reconstruction method involves isolation of each spot of a halftone image along with a neighborhood of surrounding spots, and, for each neighborhood, comparing a maximum screen pattern value producing a white spot with a minimum screen value producing a black spot.

If the minimum screen value giving a black spot is greater than the maximum screen value giving a white spot, then the grayscale pixel value of the isolated spot is the average of the maximum and minimum screen values just described. If the minimum screen value giving a black spot is less than the maximum screen value giving a white spot, then the process is repeated after deleting that portion of the neighborhood of surrounding spots containing the maximum or minimum screen value furtherest from the isolated spot. Use of the Roetling scheme is limited to orthographic or digitally created and stored dithered images since it is based on the regularity of dots in a half-tone image created with a dither.

Another U.S. Pat. No. 4,841,377 issued to Hiratsuka et al. discloses a method for estimating an original continuous tone image from a stored binary image. The method involves, inter alia, setting a plurality of scanning apertures in a binary image formed of a dither matrix, selecting one scanning aperture satisfying a predetermined condition for each picture element of a continuous image to be estimated, and estimating the continuous image on the basis of the number of white or black picture elements in the scanning aperture selected. The Hiratsuka method is similarly limited to dithered halftone images.

More recently, U.S. Pat. No. 5,027,078, issued to the present inventor, Z, Fan, discloses a method for converting halftone images to continuous tone images. The Fan method is an improvement over the Roetling method through the application of "logic filtering." This logic-filter method provides best results for digitally created and stored halftone images but it is also limited to dithered halftone images.

Additional prior art that has limited relevance to the present invention follows:

1. U.S. Pat. No. 4,691,366, "Image Enhancement", dated Sep. 1, 1987, filed by Paul Fenster, et al.
2. U.S. Pat. No. 4,782,399, "Image Processing Apparatus With High- and Low-Resolution Image Sensors and An Edge Detector", dated Nov. 1, 1988, filed by Hiroaki Sato.
3. U.S. Pat. No. 4,503,461, "Multiple Measurement Noise Reducing System Using Space-Variant Filters", dated Mar. 5, 1985, filed by Dwight G. Nishimura.
4. U.S. Pat. No. 4,811,239, "Digital Facsimile/Image Producing Apparatus", dated Mar. 7, 1989, filed by Sherman H. M. Tsao.
5. U.S. Pat. No. 4,841,374, "Image Processing Method", dated Jun. 20, 1989, filed by Matahira Kotani, et al.

In summary of the prior art, it has generally had shortcomings in preserving edge smoothing and avoiding edge blurring in the "unscreening" of continuous tone images from halftone images. Further, the prior art generally has had no effective capability for converting halftone images created by error diffusion to continuous tone images.

SUMMARY OF THE INVENTION

An object of the present invention is to provide an improved image processing system and method in which filtering is employed to convert screen structured or unstructured halftone images to continuous tone images with better edge preservation.

An image processing system is provided for converting unscreened and other halftone images to continuous tone images. The system comprises means for sequentially generating value data for successive pixels of a screened or unscreened halftone image. Means are provided for Sigma filtering each image pixel with a predetermined set of filter parameters including the filter window size and a Sigma difference range that is applied to determine which pixels in the filter window are counted in determining average window pixel values, and means are provided for generating an output continuous tone image containing the Sigma filtered pixels for storage and/or processing to a halftone copy or print.

BRIEF DESCRIPTION OF THE DRAWINGS

The accompanying drawings, which are incorporated in and constitute a part of this specification, illustrate one embodiment of the invention and together with the description provide an explanation of the objects, advantages and principles of the invention. In the drawings.

DESCRIPTION OF THE PREFERRED EMBODIMENT

Figure 1:
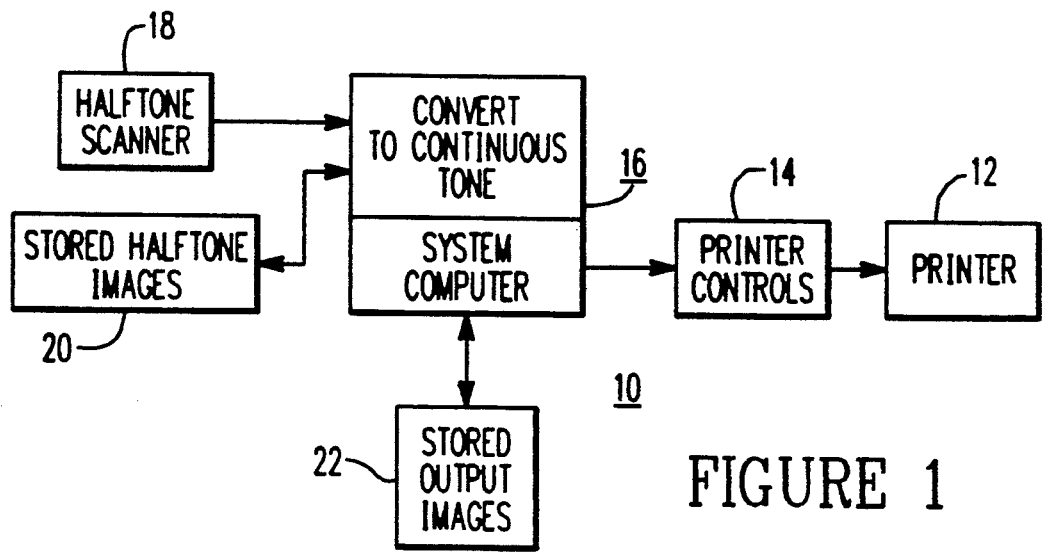
FIG. 1 shows a reprographic system in which the present invention is applied.

An image processing system 10 shown in FIG. 1 includes a conventional printer 12 that is operated in accordance with the invention by printer controls 14 under the control of a system computer 16. Input halftone images are obtained from a scanner 18 or from a first memory 20. Another memory 22 is used to store converted images for output.

In accordance with the invention, input black and white images are first converted or "unscreened" to continuous tone images, and thereafter reconverted to halftone images for print processing. If desired, unprocessed halftone images can be stored in another memory (not shown) for subsequent conversion and processing in accordance with the present invention.

The scanned or stored input images may be error-diffused or other images with no screen structure or they may be dithered images with a screen structure. However, the present invention is most effective in processing error-diffused images.

There are various applications in which it is desirable to convert halftone images to continuous tone images. In the preferred image processing embodiment, image conversion from halftone to continuous tone is performed to enable high quality printing.

In all such image conversion applications, the traditional low pass filtering approach has been characterized with blurred edges and loss of fine detail. Other converting techniques have provided some improvement as described hereinabove, but no known techniques have had a capability for high quality edge preservation, especially in the conversion of error-diffused images and other halftones without a screen structure.

In accordance with the present invention, the image processing system 10 incorporates a Sigma filter algorithm to provide improved image conversion with improved edge-preserving smoothing. Image conversion is preferably implemented with an iterative Sigma filter procedure, with different filter parameters employed with each iteration. Since the algorithm requires no information about screen properties of an image being converted, it is especially suitable for use with halftone images with no screen structure, i.e., error-diffused halftone images or halftone images scanned in low resolution. In the description that follows, halftones are defined to have pixel values of 0 and 1, and grey images are defined to have pixel values in the range of 0 to 1.

The Sigma filter was originally designed to remove noise from continuous tone images. It is based on the property that most samples of a Gaussian signal with variance $\sigma^2$ fall within a $\pm\Delta(\Delta=2\sigma)$ range. The Sigma filter smooths the noise by averaging those neighborhood pixels that have intensities within the $\Delta$ range. The Sigma filtering can be described more specifically as the following procedures:

a. Let $x_{ij}$ be the grey level of pixel (i,j) and $X^*_{ij}$ be the smoothed pixel (i,j).

b. Establish an intensity range $(x_{ij}+\Delta, x_{ij}-\Delta)$ where $\Delta=2\sigma$.

c. Sum all pixels which lie within the intensity range in an $N \times N$ window.

(d) Compute the average by dividing the sum by the number of pixels in the sum.

(e) Then $x^*_{ij}$ = the average.

Or, mathematically, let $$\delta_{k,l} = 1, \text{ if } (x_{ij} - \Delta) \leq x_{k,l} \leq (x_{ij} + \Delta)$$
$$= 0, \text{ otherwise.}$$

then $$x^*_{ij} = \Sigma_{(k,l) \text{ in the window}} \delta_{k,l} x_{k,l}/M$$

where $$M = \Sigma_{(k,l) \text{ in the window}} \delta_{k,l}$$

is the number of pixels within the intensity range.

The Sigma filter performs the same as an averaging filter in a relatively uniform region, where all the pixels in the window are within the intensity range. If the window crosses a high-contrast edge (with contrast $>\Delta$), the Sigma filter only includes in its average the pixels at the same side of the edge, thereby realizing edge-preserving filtering. In cases where sharp spot noise represented by clusters of one or two pixels is not smoothed with Sigma filtering, normal averaging (with a smaller window if desirable) can then be employed. Specifically, the above step (e) is replaced by:

$$x^*_{ij} = \text{two-Sigma average} \quad \text{if } M > K$$
$$= \text{normal average} \quad \text{otherwise}$$

where M is defined in (3) and K is a prespecified value. The value K is preferably carefully chosen to remove isolated spot noise without destroying thin features and subtle details. $K \leq N/2$ is a suitable value for this purpose.

SIGMA FILTER BASED UNSCREENING

It is not feasible to apply the Sigma filter directly to the converting or "unscreening" process, since unscreening starts with binary halftones. In the preferred embodiment, a grey image is built up gradually through several iterations with different $\Delta$ and window size parameters. Generally, the halftone is first Sigma filtered with $\Delta = 1$, which is equivalent to an average filtering. To avoid blurring edges, a very small window, such as a $2 \times 2$ window, is used in this first step. The resultant image has limited quantized grey levels (5 levels, i.e., 0, ¼, ½, ¾ and 1, for a $2 \times 2$ window). In the second iteration, a smaller $\Delta$ is applied. For example, $\Delta$ can be chosen as ¼, if a $2 \times 2$ window was used in the first step, so that any edges with contrast greater than one quantized grey level in the initial result will not be smoothed out in the second step. In the following iterations, $\Delta$ is progressively decreased, and the window size is gradually increased. The following is a typical set of $\Delta$ and window size parameters for the iterative Sigma procedure in accordance with the invention:

TABLE I

| Iteration | 1st | 2nd | 3rd | 4th |
| --- | --- | --- | --- | --- |
| $\Delta$ | 1 | ¼ | ⅛ | 1/24 |
| Window Size ($W_i$) | $2 \times 2$ | $2 \times 2$ | $3 \times 3$ | $4 \times 4$ |
| K Value ($K_i$) | 0 | 0 | 0 | 2 |

In the smooth regions, the overall effect of the above filtering is the concatenation of a series of averaging filters. For the halftones created by error diffusion, the high intensity and low intensity regions have sparser data and thus require more smoothing. This can be accomplished by increasing window size or doing one more iteration in these regions.

The following is an example that illustrates application of the described iterative Sigma filtering procedure:

TABLE II

An Example:

$$W_1 = 2 \times 2 \quad \Delta = 1 \quad K_1 = 0$$
$$W_2 = 2 \times 2 \quad \Delta = 1/4 \quad K_2 = 0$$
$$W_3 = 3 \times 3 \quad \Delta = 1/8 \quad K_3 = 0$$

Input Image:

...1 1 1 1 1 0 1 0 1 0...
...1 1 1 1 1 1 0 1 0 1...
...1 1 1 1 1 0 1 0 1 0...

Result of first iteration: (Same for each row. Only one row is shown.)

...1 1 1 1 $\frac{3}{4}$ $\frac{2}{4}$ $\frac{2}{4}$ $\frac{2}{4}$ $\frac{2}{4}$ ...

Result of second iteration: (Same for each row. Only one row is shown.)

...1 1 1 $\frac{7}{8}$ $\frac{5}{8}$ $\frac{4}{8}$ $\frac{4}{8}$ $\frac{4}{8}$ $\frac{4}{8}$ ...

Result of third iteration: (Same for each row. Only one row is shown.)

...1 1 $\frac{46}{48}$ $\frac{45}{48}$ $\frac{27}{48}$ $\frac{26}{48}$ $\frac{24}{48}$ $\frac{24}{48}$ $\frac{20}{48}$ ...

PROGRAMMED COMPUTER PROCEDURE FOR HALFTONE IMAGE UNSCREENING BY ITERATIVE SIGMA FILTERING

Figure 4:
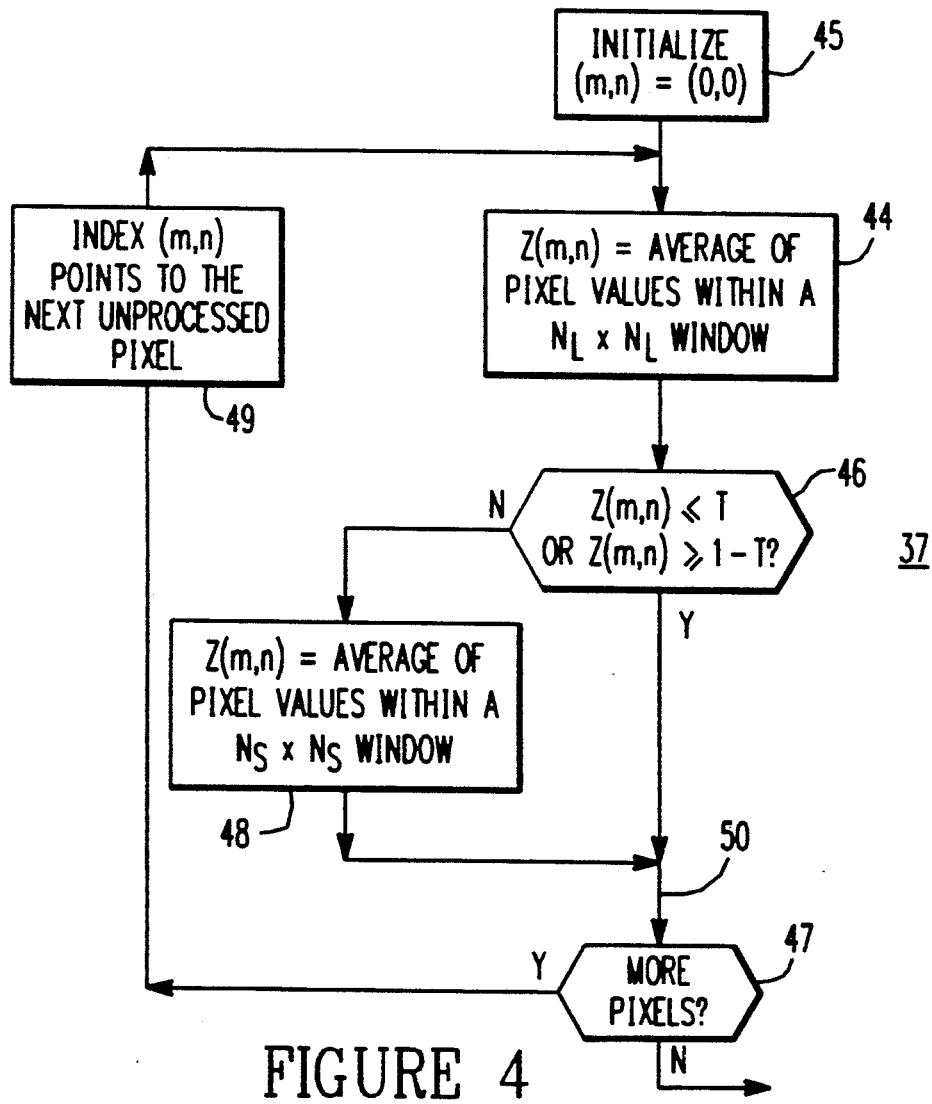
FIG. 4 shows in detail a procedure used in the program of FIG. 2 to produce adaptive averaging in a first iteration in the conversion of error diffused images.
Figure 2:
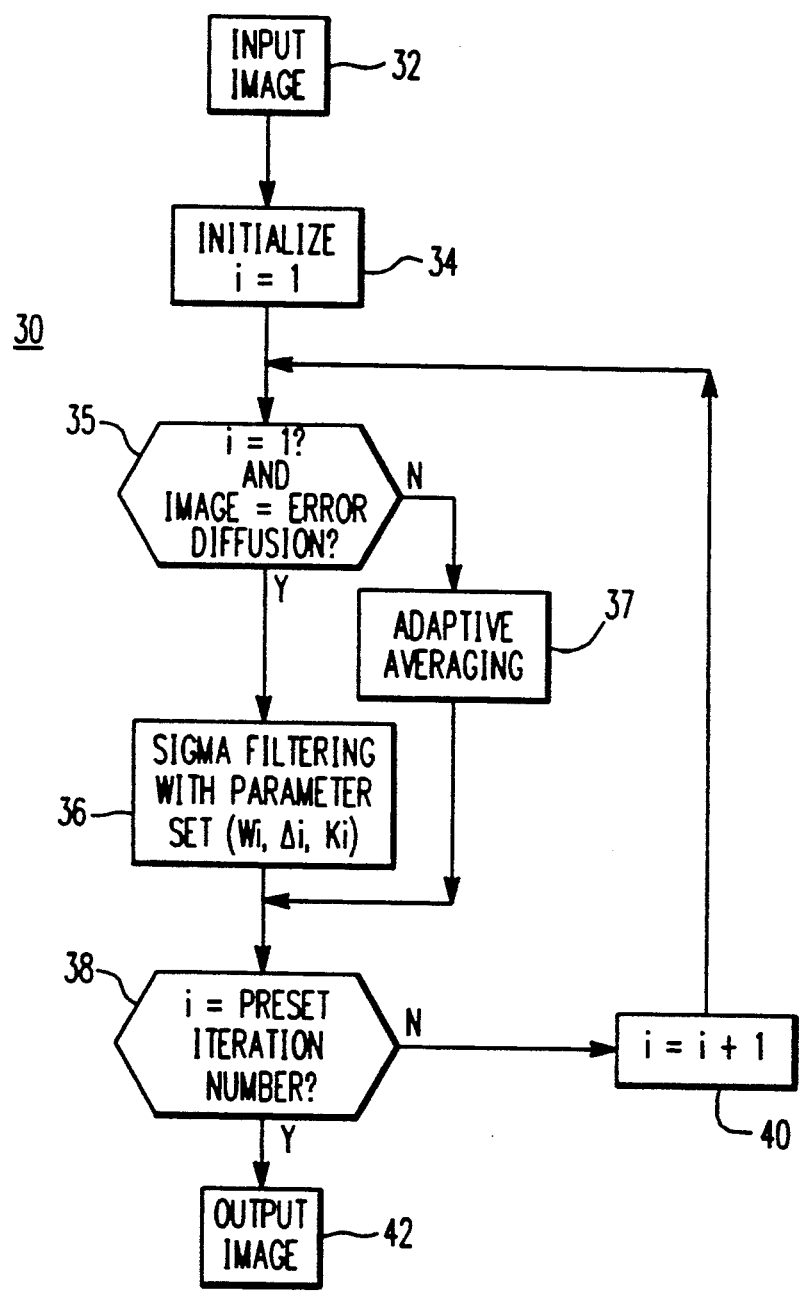
FIG. 2 shows a flow chart for a program executed in a computer in the reprographic system of FIG. 1 to convert or "unscreen" halftone images to continuous tone images in accordance with the present invention.
Figure 3:
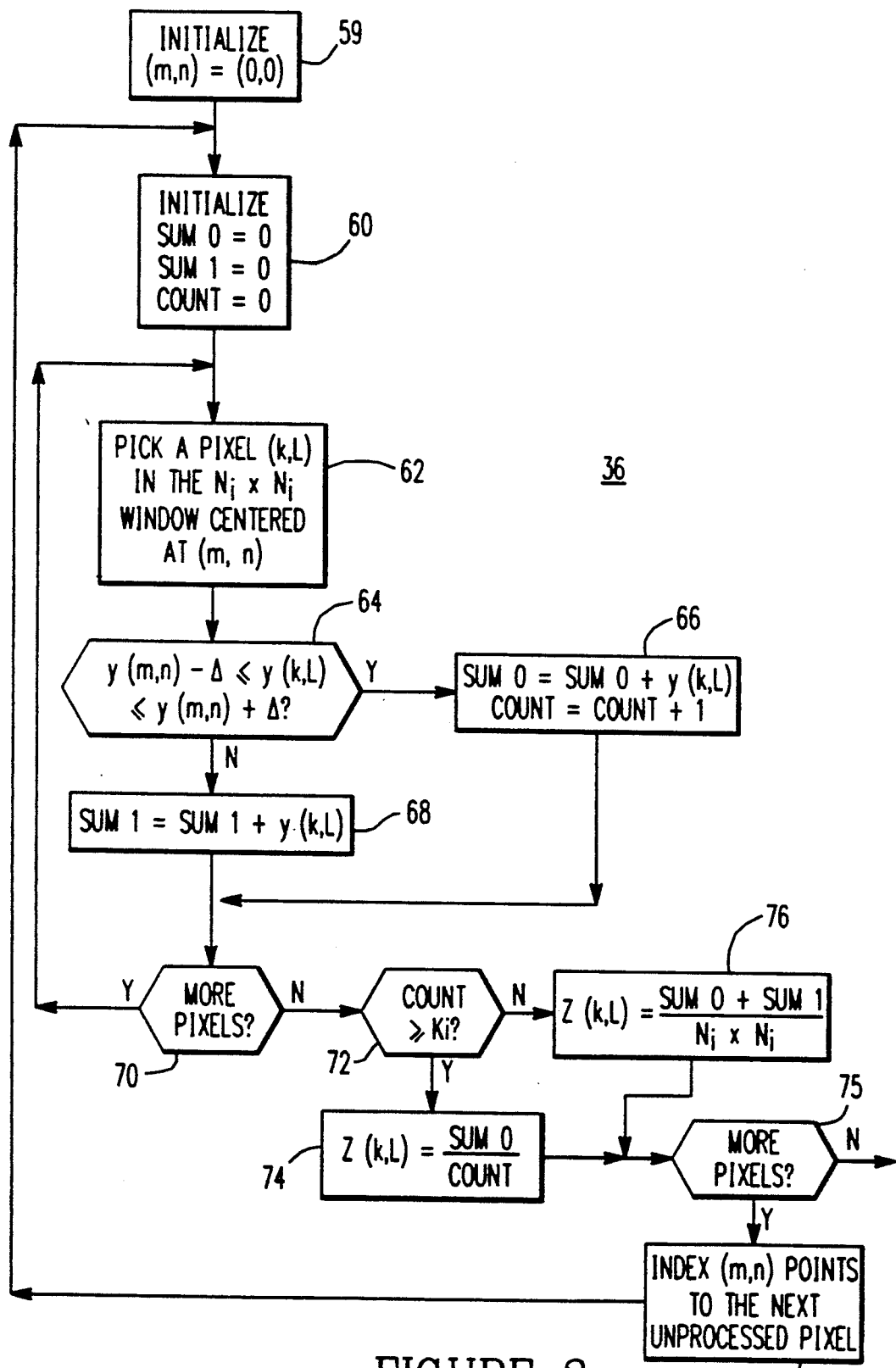
FIG. 3 shows in greater detail a Sigma filtering procedure employed in the program of FIG. 2.

In FIGS. 2–4, program procedures are illustrated for the preferred embodiment as applied to error diffused images. A flow chart 30 in FIG. 2 provides an overview of a Sigma filtering process for converting halftone images to continuous tone images with improved edge preserving smoothing in accordance with the present invention.

As indicated by a block 32, pixel data is obtained for a halftone image to be converted to a continuous tone image. A block 34 then initializes a Sigma filtering procedure for a first iteration, i.e., i=1.

A test block 35 checks the iteration number in an iterative procedure to be followed. In the first iteration of an error diffusion image, an adaptive averaging procedure is executed on the image by a block 37. Otherwise, the program flow goes to a block 36.

In the block 36, a Sigma filtering operation is performed for the pixel currently being processed in the current iteration. After all of the image pixels have been processed by the block 36, or at the end of execution of the adaptive averaging processing block 37, a test block 38 determines whether the current iteration is the last iteration, i.e., whether it is equal to a preset value for the number of iterations to be executed.

Usually, three or four iterations are sufficient to achieve quality reconstruction. However, the user can preset the number of iterations to whatever number of iterations provides the best results.

If the number of processed iterations is less than the preset number, a block 40 advances an iteration counter to the next value, and the block 36 is reexecuted using pixel data produced by the preceding iteration. When the last iteration of the Sigma filtering process has been executed, the output image is generated by an output block 42 for storage or print processing.

The present invention is especially useful in processing OR "unscreening" images having no screen structure, such as error diffused images. When the present invention is applied to error diffused images, an adaptive averaging is preferably used for the first iteration as just described.

In very dark or very bright regions of an image being processed, a large window of size $N_1 \times N_1$ is used. In other regions, a smaller window of size $N_s \times N_s$ is used. A preset threshold T in the range 0 to 0.5 defines "very bright" and "very dark" regions. Typically, the value of T can be set equal to ⅛. A region with an average pixel value no greater than T is considered to be very dark. A region having an average pixel value less than $(1-T)$ is considered to be very bright.

As shown in FIG. 4 for an iteration procedure 43 employed in the block 37 (FIG. 2) as the first iteration for error diffusion images, the image is processed in a block 44 with large overlapping windows, having a size $(l_1 \times l_2)$ and centered at a pixel (m, n), to calculate the average pixel value for each window. The window processing is like that described subsequently herein for the Sigma filtering procedure 36 with $\Delta = 1$. Next, a test block 46 determines whether the average pixel value for the currently processed window corresponds to a very bright or very dark region. If it does, a return indicated by a reference character 50 is followed to a test block 47 where a check is made to determine whether more pixels need to be processed. If so, a return is made to process the next pixel in the image.

If a negative test results in the block 46, a block 48 processes the image with smaller overlapping windows having a size $(s_1 \times s_2)$ and centered at pixel (m, n) to calculate the average pixel value for each window. Thereafter, the program flow follows the path 50 to the test block for further image processing as already described. When all of the pixels in the image have been processed, the procedure 37 is ended and the Sigma filter processing proceeds as described for FIG. 2.

The Sigma filtering procedure 36 referenced in FIG. 2 is shown in greater detail in FIG. 3. Thus, a block 59 first initializes pixel counter (m,n) values at (0,0) and a block 60 initializes to 0 a value counter SUM 0 for pixel values within the Sigma difference range, a value counter SUM 1 for pixel values outside the Sigma difference range, and a processed pixel counter COUNT for number of pixels within the Sigma range.

The image is processed with the use of overlapping windows having a size, $N_i \times N_i$, and the windows are processed sequentially by the procedure 36. Each window is structured so that the pixel being processed (m,n) is centered in the window. For even block sizes, the window is appropriately located relative to the pixel to be processed. For example, for a window having a size 2 pixels×2 pixels, the pixel being processed can be located in the upper left hand corner of the window. Preferably, the windows are rectangular or square in shape, and the overlapping arrangement is such that as the procedure sequentially calculates values for successive pixels in each pixel row, the window that is used is correspondingly sequenced along the row pixel by pixel.

In a block 62, a pixel in the window being processed is selected for valuation. A test block 64 then determines whether the selected pixel is within or outside the Sigma difference range. If it is within the range, the SUM 0 counter is advanced by the binary value of the pixel as indicated by reference character 66 and the COUNT counter is advanced by 1. If it is outside the Sigma difference range, the SUM 1 counter is advanced by the value of the pixel as indicated by reference character 68.

After accounting for the value of the currently selected pixel, a test block 70 determines whether more pixels need to be processed for the current window. If so, a return is made to the block 62 and the process just described is repeated for the next pixel. The process continues to be repeated until the block 70 indicates that all of the pixels in the current window have been processed.

Generally, the Sigma difference range is a grey range within which pixel values are counted in an averaging process that preserves edges and avoids the edge smearing commonly found in the prior art. If the window being processed is in a smooth image region, all pixels within the window will be in range and the effect for that window will be the same as simple averaging. However, if an edge exists within the window, the valuation count includes values of only those pixels on the side of the edge on which the pixel being processed is located. As a result, there is no blurring of edges.

Further, the effect of the iterative Sigma filtering procedure described herein for the preferred embodiment is to build up the grey tones with successive iterations wherein successive iterations preferably have gradually increasing window sizes and gradually decreasing $\Delta$ values. In the earlier iterations, it is desirable to keep the window size as small as possible to avoid edge blurring. However, if the window size is kept small for later iterations, the process takes considerably more time. Therefore, in later iterations, larger windows are preferred to speed up the process consistently with avoidance of edge blurring.

With respect to the values of $\Delta$ to be used in the successive iterations, the $\Delta$ value in the first iteration preferably is large enough to enable effective averaging to occur. However, in later iterations the $\Delta$ value preferably is smaller to avoid edge blurring. As previously indicated, a total of three or four iterations is usually sufficient to good unscreening results.

With reference again to the procedure 36, if a test block 72 determines that the value of COUNT is greater than or equal to Ki, a block 74 sets the average pixel value for the current window equal to SUM 0/COUNT. If COUNT is less than Ki, the average pixel value is made equal to the sum (SUM 0+SUM 1) divided by the total number of pixels in the window.

After pixel value setting in the block 74 or 76, a test block 75 checks for more pixels. If the image is completed, a return is made to the block 38 (FIG. 2). Otherwise, the pixel counter values are advanced by a block 77 and the next pixel is processed in the manner just described.

Experiments have shown that the detail preserving quality of the unscreening results depends mainly on the parameters of the first two iterations, as they are responsible for the high-contrast edges, which are most sensitive to human perception.

The foregoing description of the preferred embodiment of the invention has been presented for purposes of illustration and description. The description is not intended to be exhaustive or to limit the invention to the precise form disclosed, and modifications and variations of the invention may be made in light of the above disclosure or may be developed from practice of the invention. It is intended that the description provide an explanation of the principles of the invention and its practical application to enable one skilled in the art to use the invention in various embodiments and with various modifications as are suited to the particular use contemplated. It is intended that the scope of the invention be defined by the claims appended hereto, and their equivalents.

What is claimed is:

1. An image processing system for converting unscreened and other halftone images to continuous tone images, said system comprising:
    means for sequentially generating value data for successive pixels of a screened or unscreened halftone image;
    means for Sigma filtering each image pixel of said successive pixels with a predetermined set of filter parameters including a filter window size and a Sigma difference range that is applied to determine which pixels in the filter window are counted in determining average window pixel values; and
    means for generating an output continuous tone image containing the Sigma filtered pixels for storage or processing to a halftone copy or print.

2. The image processing system of claim 1, wherein means are provided for iteratively applying the output image from said Sigma filter means to the input of said Sigma filter means for a predetermined number of iterations, and wherein the continuous tone image produced by said generating means is the Sigma filtered image from the last iteration.

3. The image processing system of claim 2, wherein the window size is increased in at least some of the successive Sigma filter iterations and the Sigma difference range is decreased in said at least some of the successive Sigma filter iterations.

4. The image processing system of claim 3, wherein the window size is increased and the Sigma difference range is decreased in each successive Sigma filter iteration.

5. The image processing system of claim 3, wherein a parameter Ki has a preselected value equal to a threshold value of counted pixels in the filter window, and wherein all counted pixels are used in determining the average window pixel value if the pixel count is less than Ki and only pixels within the Sigma difference range are used in determining the average window pixel value if the pixel count is equal to or greater than Ki.

6. The image processing system of claim 2, wherein the halftone image is an error diffused image and wherein means are provided for processing the error diffused halftone image with an averaging filter in a first iteration with the output from the averaging filter with a variable window size being applied to the input of said Sigma filter means for Sigma iterative filtering in subsequent iterations until the predetermined number of iterations has been executed.

7. A method for converting unscreened and other halftone images to continuous tone images, the steps of said method comprising:
    sequentially generating value data for successive pixels of a screened or unscreened halftone image;
    Sigma filtering each image pixel with a predetermined set of filter parameters including a filter window size and a Sigma difference range that is applied to determine which pixels in the filter window are counted in determining average window pixel values; and
    generating an output continuous tone image containing the Sigma filtered pixels for storage or processing to a halftone copy or print.

8. The method of claim 7, wherein the steps further comprise iteratively applying the output image from the Sigma filter step to the input of the Sigma filter step for a predetermined number of iterations, and wherein the continuous tone image produced by said generating step is the Sigma filtered image from the last iteration.

* * * * *